US006957424B2

United States Patent
Stecher

(10) Patent No.: US 6,957,424 B2
(45) Date of Patent: Oct. 18, 2005

(54) METHOD FOR OPTIMIZING PERFORMANCE OF SOFTWARE APPLICATIONS WITHIN A COMPUTER SYSTEM

(75) Inventor: John Joseph Stecher, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 686 days.

(21) Appl. No.: 10/087,304

(22) Filed: Mar. 1, 2002

(65) Prior Publication Data

US 2003/0167461 A1 Sep. 4, 2003

(51) Int. Cl.[7] .............................................. G06F 9/45
(52) U.S. Cl. ...................... 717/151; 717/153; 717/159
(58) Field of Search ............................... 717/146–147, 717/151–155, 158–162, 100–101, 120

(56) References Cited

U.S. PATENT DOCUMENTS

| | | | | |
|---|---|---|---|---|
| 5,754,860 A | * | 5/1998 | McKeeman et al. | 717/124 |
| 6,070,009 A | * | 5/2000 | Dean et al. | 717/130 |
| 6,144,954 A | * | 11/2000 | Li | 706/62 |
| 6,539,541 B1 | * | 3/2003 | Geva | 717/150 |
| 6,549,930 B1 | * | 4/2003 | Chrysos et al. | 718/104 |
| 6,625,500 B1 | * | 9/2003 | Li | 700/29 |
| 6,658,654 B1 | * | 12/2003 | Berry et al. | 717/131 |
| 6,662,357 B1 | * | 12/2003 | Bowman-Amuah | 717/120 |
| 6,674,908 B1 | * | 1/2004 | Aronov | 382/232 |
| 6,772,413 B2 | * | 8/2004 | Kuznetsov | 717/136 |

OTHER PUBLICATIONS

Ramirez et al, "Code layout optimization for transaction processing workloads", IEEE, pp 155–164, 2001.*
Hill et al, "ransfer optimization via simultaneous perturbation stochastic approximation", ACM Proc. of 1995 Winter Simulation Conf, pp 242–249, 1995.*
Lempel et al, "Optimizing result prefetching in web search engines with segmented indicies", ACM Trans on internet tech. vol. 4, No. 1, pp 31–59, Feb. 2004.*
Stimler et al, "A methodlogy for calculating and optimizing real time system performance", Comm. of the AC< vol. 11, No. 7, pp 509–516, Jul. 1968.*

* cited by examiner

*Primary Examiner*—Anil Khatri
(74) *Attorney, Agent, or Firm*—Dillon & Yudell LLP

(57) ABSTRACT

A method for optimizing a software application within a computer system is disclosed. A controller and a group of agents are initially provided within a computer system. Each agent within the group is assigned a different range of numbers, and each range initially has an identical size. After a random number has been generated by the controller, an agent among the group of agents having an assigned range within which the random number falls is requested to change a parameter of a software application within the computer system. The range of numbers assigned to that agent is then adjusted according to a performance result of the computer system after the parameter change.

15 Claims, 3 Drawing Sheets

METHOD FOR OPTIMIZING PERFORMANCE OF SOFTWARE APPLICATIONS WITHIN A COMPUTER SYSTEM

BACKGROUND OF THE INVENTION

1. Technical Field

The present invention relates to data processing in general, and in particular to performance optimization. Still more particularly, the present invention relates to a method for optimizing performance of software applications within a computer system.

2. Description of the Related Art

With today's computer system, it is common to have multiple software applications concurrently executing within a single computer system, and most of them typically have hundreds of settings that can be manipulated. Quite often, any change of a setting within one software application can have either a positive or a negative effect on the performance of the entire computer system. However, most end users will probably never change or manipulate any of the settings within a software application to their advantage because of the huge number of settings that can be manipulated and the time required for testing each setting in order to find out whether or not a change would provide a gain in the total performance to the entire computer system.

It is recognized that there are many prior art performance monitors currently existed in computer systems. By employing various performance monitoring techniques, most prior art performance monitors can be instrumental in enhancing the performance of a computer system. The term "performance monitoring" refers to the process of monitoring the performance of various system components within a computer system during normal operating conditions.

Performance monitoring is a key factor in the operation and maintenance of many of today's complex computer systems. Extensive research has been directed to improving existing performance monitoring techniques for generating efficient organization of program code. The present disclosure provides an improved method for optimizing performance of software applications within a computer system.

SUMMARY OF THE INVENTION

In accordance with a preferred embodiment of the present invention, a controller and a group of agents are provided within a computer system. Each agent within the group is assigned a different range of numbers, and each range initially has an identical size. After a random number has been generated by the controller, an agent among the group of agents having an assigned range within which the random number falls is requested to change a parameter of a software application within the computer system. The range of numbers assigned to that agent is then adjusted according to a performance result of the computer system after the parameter change.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be implemented in a variety of computer systems. The computer system may be, for example, a personal computer, a midrange computer or a mainframe computer. In addition, the computer system may be a stand-alone system or part of a computer network such as a local-area network (LAN) or a wide-area network (WAN).

Figure 1:
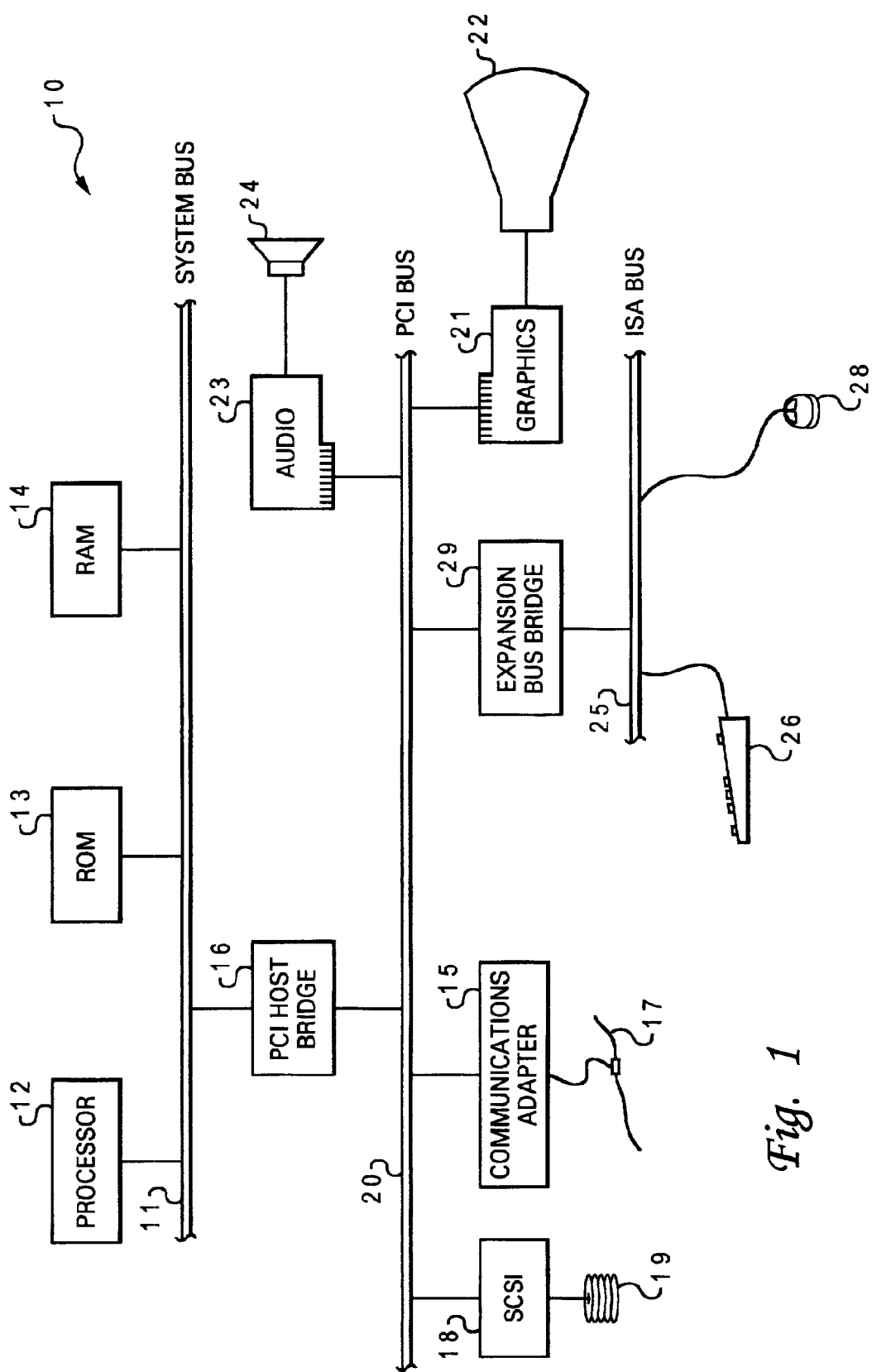
FIG. 1 is a block diagram of a computer system in which a preferred embodiment of the present invention is incorporated.

Referring now to the drawings and, in particular, to FIG. 1, there is depicted a block diagram of a computer system in which a preferred embodiment of the present invention is incorporated. As shown, a computer system 10 includes a processor 12, a read-only memory (ROM) 13, and a random access memory (RAM) 14, all connected to a system bus 11. Processor 12, ROM 13, and RAM 14 are also coupled to a peripheral component interconnect (PCI) bus 20 through a PCI host bridge 16. PCI host bridge 16 provides a low latency path through which processor 12 may directly access PCI devices mapped anywhere within bus memory and/or input/output (I/O) address spaces. PCI host bridge 16 also provides a high bandwidth path allowing PCI devices to directly access RAM 14.

Also attached to PCI bus 20 is a communications adapter 15 and a small computer system interface (SCSI) 18. Communications adapter 15 connects computer system 10 to a LAN 17. SCSI 18 controls a high-speed SCSI disk drive 19. In addition, an audio adapter 23 and a graphics adapter 21 are attached to PCI bus 20. Graphics adapter 21 controls visual output through a video monitor 22, and audio adapter 23 controls audio output through a speaker 24. PCI bus 20 is coupled to an industry standard architecture (ISA) bus 25 via an expansion bus bridge 29 such as a PCI-to-ISA bus bridge. A keyboard 26 and a mouse 28 are attached to ISA bus 25 for performing various basic I/O functions.

Figure 2:
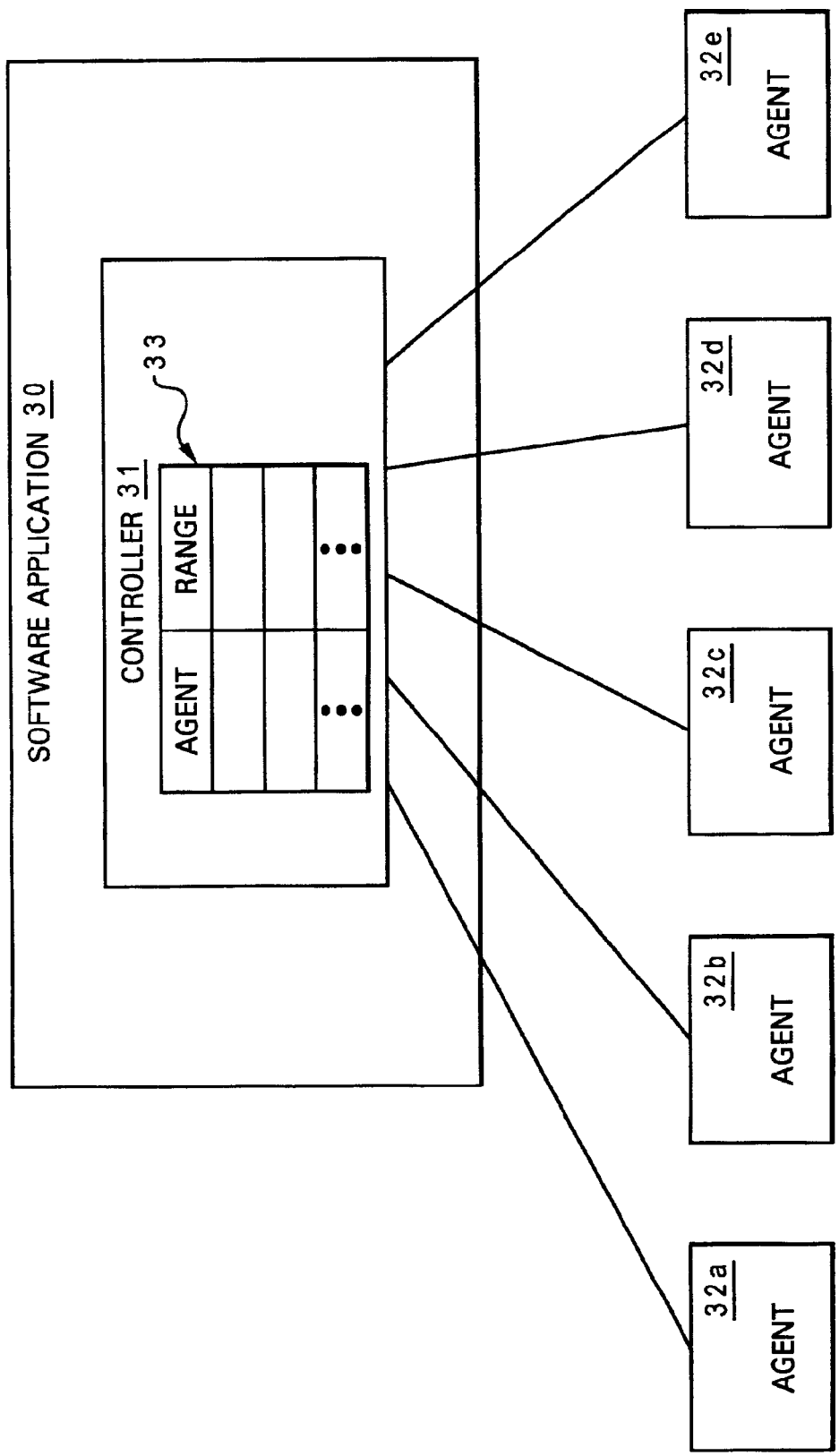
FIG. 2 is a block diagram of various software components residing within the computer system from FIG. 1, in accordance with a preferred embodiment of the present invention.

With reference now to FIG. 2, there is depicted a block diagram of various software components residing within a computer system, such as computer system 10 from FIG. 1, in accordance with a preferred embodiment of the present invention. As shown, a software application 30 includes a controller 31 utilized to interface with various software agents such as agents 32a–32e. Controller 31 monitors the performance characteristics of computer system 10 via various parameters such as system throughput, processor utilization, response time, etc. Controller 31 relies on the above-mentioned parameters to keep abreast of any changes in the total performance of computer system 10 that are attributed to the changes made by agents 32a–32e to computer system 10. By utilizing the above-mentioned parameters, controller 31 can determine whether certain changes have a positive or a negative effect on the total performance of computer system 10. After evaluating the information related to the above-mentioned parameters, controller 31 can either request the work of any of agents 32a–32e be undone (i.e., reverted back to the original settings) or allow an agent to make further changes to computer system 10.

Agents 32a–32e are an abstract class that must be inherited by a class containing certain parameters that a programmer wishes to allow controller 31 to tune. Such class is abstract because its run methods and other things may be designed by the architect of the controller-agent interface without a system component developer being responsible for its functionality. Each of agents 32a–32e is basically a thread that monitors one very specific part of an application, such as cache size, thread pool size, database connects, etc. Agents 32a–32e can be pending in a queue within controller 31, and then wait to be wakened up by controller 31. Upon being woken up, agents 32a–32e survey their respective component(s) and begin to take action accordingly, such as updating parameters or whatever is relevant to increase performance in their respective area. Once the update has been completed, each of agents 32a–32e notifies controller 31 that its task has been completed and then waits for controller 31 to wake it up again. If controller 31 recognizes a performance regression, controller 31 notifies the responsible agent to undo its previous work, such as changing a parameter back to its setting before the update.

Figure 3:
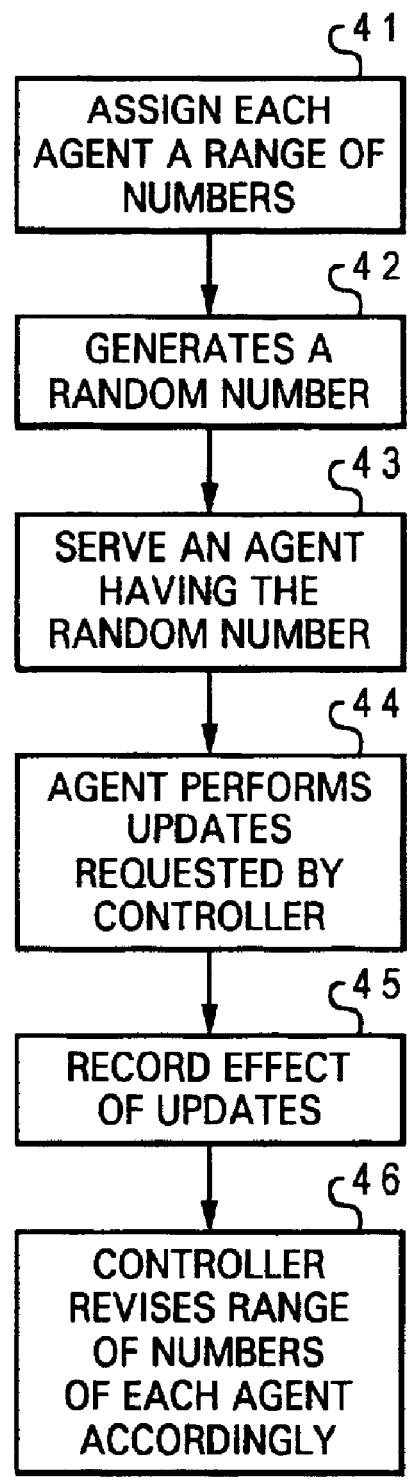
FIG. 3 is a method for optimizing performance of software applications within the computer system from FIG. 1, in accordance with a preferred embodiment of the present invention.

Referring now to FIG. 3, there is illustrated a method for optimizing performance of software applications within a computer system, such as computer system 10 from FIG. 1, in accordance with a preferred embodiment of the present invention. Initially, each agent is assigned a range of numbers, as shown in block 41. Each agent should have a different range of numbers, but initially the size of the range of numbers are identical. Taking agents 32a–32e from FIG. 2 as an example, agent 32a is assigned a range of 1–20, agent 32b is assigned a range of 21–40, agent 32c is assigned a range of 41–60, agent 32d is assigned a range of 61–80, and agent 32e is assigned a range of 81–100. Although each of agents 32a–32e has a different range of numbers, the lengths of the ranges for all agents 32a–32e are identical, which is 19 in the present example. Next, a controller generates a random number, as depicted in block 42. In the present example, the random number should be an integer that falls anywhere within the range of 1–100. The controller then serves an agent having a range within which the random number falls, as shown in block 43. For example, if the random number is 23, then the controller will serve agent 32b because random number 23 falls within the range of agent 32b. The agent being served by the controller then performs an update requested by the controller, as depicted in block 44, and the effect of the update with respect to the performance of the entire computer system is recorded, as shown in block 45.

After all the agents have been served at least once by the controller, the controller revises the range of numbers of each of the agents accordingly, as shown in block 46. Specifically, the range of numbers of each agent is changed in accordance with the result of the updates performed by that agent. If the updates performed by an agent contributes a positive total performance to the entire computer system, then the range of numbers of the agent will be increased proportionally. Otherwise, if the updates performed by an agent contributes a negative total performance to the entire computer system, then the range of numbers of the agent will be decreased proportionally. In essence, controller 31 acts as a manager to the agents and determines which agents are doing a good job (i.e., contributes a positive total performance to the computer system) and which are not. Controller 31 "rewards" those agents that had done a good job by giving them more work, and "penalizes" those agents that had not.

Initially, an equal working weight is assigned to each agent. The equal working weight is determined by 1/total number of agents. For example, if there is a total of five agents, such as agents 32a–32e, then each agent's initial working weight is ⅕=0.20. The working weight of each agent corresponds with the range of numbers of each agent. As the working weight changes, the range of numbers changes accordingly. The procedure for changing the working weight for the agents after an iteration is as follows:

a. determine a success ratio by adding all positive performance change values from agents (and ignore all negative performance change values);
b. if success ratio=0, then equal working weights are assigned to all agents;
c. if success ratio>0, then the working weight for each agent is calculated by:
 i. calculate a new working weight for each agent that has a positive performance (the new working weights for agents with negative performance remain the same)

$$\forall_n \text{ new working weight}(n) = \frac{\text{improvement}}{\text{success ratio}}$$

where n=agent number
 ii. sum all new working weights of all agents as total weight;
 iii. normalize working weight for each agent $$\forall_n \text{ working weight}(n) = \frac{\text{new working weight}(n)}{\text{total weight}}$$

For example, if the total performance percentage changes to the computer system after the updates by agents 32a–32e are +10%, −20%, +50%, +5%, and −10%, respectively, then the improvements for agents 32a–32e are +0.1, −0.2, +0.5, +0.05, and −0.1, respectively. The success ratio is equal to 0.1+0.5+0.05=0.65. Since the success ratio is greater than zero, the new working weights for agents 32a, 32c and 32d are calculated as 0.15, 0.77 and 0.08, respectively, while the new working weights for agents 32b and 32e remain 0.20. The total new weight is 0.15+0.20+0.77+0.08+0.20=1.40, and the normalized working weights for agents 32a–32e are calculated as 0.11, 0.14, 0.55, 0.06 and 0.14, respectively.

A new range of numbers for each agent is then assigned according to the working weight calculated above. In the present example, the new ranges of numbers for agents 32a–32e are 1–11, 12–25, 26–80, 81–85, and 86–100, respectively.

In order to keep track of the range of numbers of each of agents 32a–32e and the total performance percentage changes affected by their respective updates, controller 31 maintains a number range table, such as a number range table 33 shown in FIG. 2. The range of numbers for each agent is generated and updated in real-time. The ranges of numbers are updated after each iteration, and each iteration is defined as all agents have been served at least once by the controller after a previous update in the range of numbers. Within an iteration, it is highly likely that some agents may be served by controller 31 more than once, depending on how even the random numbers are being distributed.

As has been described, the present invention provides a method for optimizing performance of software applications within a computer system. With the present invention, performance tuning can be performed automatically, without any user intervention. The automated performance tuning of the present invention can be performed in a continuous basis, always allowing a software application to adjust to its current needs to provide optimal resource management and performance. By allowing a computer system to tune and adjust its parameters automatically, the computer system can test and makes adjustment much faster than humanly possible, thus yielding an optimal performance setting in far less time than required if performed manually.

As disclosed, the present invention is implemented in a two-layer scheme, with a controller in a first layer and agents in a second layer. However, the present invention can also be implemented in an n-layer scheme, with a controller in a first layer, followed by some agents acting as a controller at a second layer for controlling other agents beneath the second layer. For example, a controller can control agents that represent different parts of an operating system, where the controller works on agents that represent each part of the operating system as an abstract like one agent for the file system, one for the network interface, etc. Then, the file system agent would in turn control its own agents beneath it, with one working on disk access parameters, another one on directory cleanup, etc.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for optimizing performance of a software application within a computer system, wherein said software application includes a plurality of agents, said method comprising:
assigning each of said plurality of agents a different segment, wherein all of said segments initially have an identical size;
repeatedly performing:
randomly selecting one of said segments;
requesting a particular one of said plurality of agents assigned said selected segment to change a parameter of said software application; and
after each of said plurality of agents has been requested at least once, adjusting segment size assigned to one or more of said plurality of agents according to a performance change in said software application associated with the parameter change initiated by each respective agent.

2. The method of claim 1, wherein said adjusting further includes increasing segment size of an agent if the corresponding performance of said software application has improved.

3. The method of claim 1, wherein said adjusting further includes decreasing segment size of an agent if the corresponding performance of said software application has worsen.

4. The method of claim 1, wherein said method further includes generating a working weight for each of said plurality of agents, wherein said working weight corresponds with a segment size.

5. The method of claim 4, wherein said generating a working weight further includes calculating a new working weight for each of said plurality of agents that has a positive performance by $$\forall_n \quad \text{new working weight}(n) = \frac{\text{improvement}}{\text{success ratio}}$$

where n=agent number and said success ratio is determined by adding all positive performance change values from all said plurality of agents and ignoring all negative performance change values.

6. A computer program product residing on a computer usable medium for optimizing software applications within a computer system, wherein said software application includes a plurality of agents, said computer program product comprising:
program code means for assigning each of said plurality of agents a different segment, wherein all of said segments initially have an identical size;
program code means for repeatedly performing:
randomly selecting one of said segments;
requesting a particular one of said plurality of agents assigned said selected segment to change a parameter of said software application; and
program code means for adjusting segment size assigned to one or more of said plurality of agents according to a performance change in said software application associated with the parameter change initiated by each respective agent, after each of said plurality of agents has been requested at least once.

7. The computer program product of claim 6, wherein said program code means for adjusting further includes program code means for increasing segment size of an agent if the corresponding performance of said software application has improved.

8. The computer program product of claim 6, wherein said program code means for adjusting further includes program code means for decreasing segment size of an agent if the corresponding performance of said software application has worsen.

9. The computer program product of claim 6, wherein said computer program product further includes program code means for generating a working weight for each of said plurality of agents, wherein said working weight corresponds with a segment size.

10. The computer program product of claim 9, wherein said program code means for generating a working weight further includes program code means for calculating a new working weight for each of said plurality of agents that has a positive performance by $$\forall_n \quad \text{new working weight}(n) = \frac{\text{improvement}}{\text{success ratio}}$$

where n=agent number and said success ratio is determined by, adding all positive performance change values from all said plurality of agents and ignoring all negative performance change values.

11. A data processing system having a controller for optimizing software applications within a computer system, wherein said software application includes a plurality of agents, said data processing system comprising:
means for assigning each of said plurality of agents a different segment, wherein all of said segments initially have an identical size;

means for repeatedly performing:
  randomly selecting one of said segments;
  requesting a particular one of said plurality of agents assigned said selected segment to change a parameter of said software application; and
means for adjusting segment size assigned to one or more of said plurality of agents according to a performance change in said software application associated with the parameter change initiated by each respective agent, after each of said plurality of agents has been requested at least once.

12. The data processing system of claim 11, wherein said means for adjusting further includes program code means for increasing segment size of an agent if the corresponding performance of said software application has improved.

13. The data processing system of claim 11, wherein said means for adjusting further includes program code means for decreasing segment size of an agent if the corresponding performance of said software application has worsen.

14. The data processing system of claim 11, wherein said data processing system further includes program code means for generating a working weight for each of said plurality of agents, wherein said working weight corresponds with a segment size.

15. The data processing system of claim 14, wherein said means for generating a working weight further includes program code means for calculating a new working weight for each of said plurality of agents that has a positive performance by $$\forall_n \quad \text{new working weight}(n) = \frac{\text{improvement}}{\text{success ratio}}$$

where n=agent number and said success ratio is determined by adding all positive performance change values from all said plurality of agents and ignoring all negative performance change values.

* * * * *